United States Patent
Gong et al.

(10) Patent No.: US 6,658,385 B1
(45) Date of Patent: Dec. 2, 2003

(54) METHOD FOR TRANSFORMING HMMS FOR SPEAKER-INDEPENDENT RECOGNITION IN A NOISY ENVIRONMENT

(75) Inventors: Yifan Gong, Plano, TX (US); John J. Godfrey, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/501,879

(22) Filed: Feb. 10, 2000

Related U.S. Application Data

(60) Provisional application No. 60/124,122, filed on Mar. 12, 1999.

(51) Int. Cl.[7] .............................................. G10L 15/06
(52) U.S. Cl. ....................................... 704/244; 704/256
(58) Field of Search ................................ 704/244, 243, 704/245, 255, 256

(56) References Cited

U.S. PATENT DOCUMENTS

| | | | | |
|---|---|---|---|---|
| 5,715,367 A | * | 2/1998 | Gillick et al. ................ | 704/254 |
| 5,727,124 A | * | 3/1998 | Lee et al. .................... | 704/233 |
| 5,787,394 A | * | 7/1998 | Bahl et al. ................... | 704/238 |
| 5,793,891 A | * | 8/1998 | Takahashi et al. .......... | 382/228 |
| 5,924,065 A | * | 7/1999 | Eberman et al. ............ | 704/231 |
| 6,067,513 A | * | 5/2000 | Ishimitsu .................... | 704/233 |

FOREIGN PATENT DOCUMENTS

| | | | |
|---|---|---|---|
| EP | 0 691 640 A2 | * 10/1996 | ................ 382/228 |

OTHER PUBLICATIONS

Chien, J.T. and H.–C. Wang, "Adaptation of Hidden Markov Model for Telephone Speech Recognition and Speaker Adaptatiion," IEE Proc. Visioin, Image, and Signal Proc., vol. 144–3, Jun. 1997, pp. 129–135.*

Angelini, B., F. Brugnara,D. Falavigna,D. Giuliani,R. Gretter,and M. Omologo, "Speaker Independent Continuous Speech Recognition Using an Acoustic–Phonetic Italian Corpus," Proc. Int. Conf. Speech Language Proc. ICSLP–94, v. 3, 1391–1394, Sep. 1994.*

* cited by examiner

Primary Examiner—Richemond Dorvil
Assistant Examiner—Donald L. Storm
(74) Attorney, Agent, or Firm—W. James Brady, III; Frederick J. Telecky, Jr.

(57) ABSTRACT

On improved transformation method uses an initial set of Hidden Markov Models (HMMs) trained on a large amount of speech recorded in a low noise environment R to provide rich information on co-articulation and speaker variation and a smaller database in a more noisy target environment T. A set H of HMMs is trained with data provided in the low noise environment R and the utterances in the noisy environment T are transcribed phonetically using set H of HMMs. The transcribed segments are grouped into a set of Classes C. For each subclass c of Classes C, the transformation $\Phi_c$ is found to maximize likelihood utterances in T, given H. The HMMs are transformed and steps repeated until likelihood stabilizes.

6 Claims, 2 Drawing Sheets

METHOD FOR TRANSFORMING HMMS FOR SPEAKER-INDEPENDENT RECOGNITION IN A NOISY ENVIRONMENT

This application claims priority under 35 USC 119(e)(1) of provisional application No. 60/124,122 filed Mar. 12, 1999.

FIELD OF INVENTION

This invention relates to speaker-independent speech recognition and more particularly to speaker-independent speech recognition in a noisy environment.

BACKGROUND OF THE INVENTION

Speech recognition for matched conditions has achieved low recognition errors. The matched conditions is where the training and testing are performed in the same acoustic conditions. A word error rate (WER) of 1% has been reported for connected digits over a telephone network. Results such as this are achieved using a large amount of training data under conditions as close as possible to the testing conditions. It is highly desirable to provide speech recognition in a noisy environment. One such environment is hands-free speech recognition in a car. The microphone is often placed somewhere remote from the user such as in the corner of the windshield. The road noise, the wind noise, and the speaker's remoteness from the microphone cause severe mismatch conditions for recognition. For such recognition tasks, a collection of large databases is required to train speaker-independent Hidden Markov Models (HMMs). This is very expensive. If HMMs are used in cross-condition recognition, such as using a close-talking microphone in a quiet office for training, and then testing on hands-free recognition in a car, the mismatch will degrade recognition performance substantially. In terms of power spectral density, the mismatch can be characterized by a linear filter and an additive noise: $[Y(\omega)]=|H(\omega)|^2.|X(\omega)|+|N(\omega)|$ where $Y(\omega)$ represents the speech to be recognized, $H(\omega)$ the linear filter, $X(\omega)$ the training speech, and $N(\omega)$ the noise. In the log spectral domain, this equation can be written as:

$$\log|Y(\omega)|=\log|X(\omega)|+\psi(N(\omega),X(\omega),H(\omega)) \quad (1)$$

with $$\psi(N(\omega), X(\omega), H(\omega))\triangleq\log\log|H(\omega)|^2 + \log\left(1 + \frac{|N(\omega)|}{|X(\omega)|\cdot|H(\omega)|^2}\right) \quad (2)$$

$\psi$ can be used to characterize the mismatch, which depends on the linear filter, the noise source and the signal itself.

To overcome the mismatch, several types of solutions have been reported. For example, Cepstral Mean Normalization (CMN) is known for its ability to remove the first term $\omega$ (i.e., stationary bias) in cepstra. See, for example, S. Furui article, "Cepstral Analysis Technique for Automatic Speaker Verification," *IEEE Trans. Acoustics, Speech and Signal Processing* ASSP-29(2):254–272, April 1981. It has been shown that using CMN, telephone quality speech models can be trained with high quality speech. See article of L. G. Neumeyer, V. V. Digalakis, and M. Weintraub, "Training Issues and Channel Equalization Techniques for The Construction of Telephone Acoustic Models Using A High-Quality Speech Corpus," *IEEE Trans. on Speech and Audio Processing*, 2(4):590–597, October 1994. However, this is not effective for the second term, which is caused by additive noise and cannot be assumed constant within the utterance. Two-level CMN alleviates this problem by introducing a speech mean vector and a background mean vector. See, for example, S. K. Gupta, F. Soong, and R. Haimi-Cohen, High-Accuracy Connected Digit Recognition for Mobile Applications, in *Proc. of IEEE Internat. Conf. on Acoustics, Speech And Signal Processing*, pages 57–60, Atlanta, May 1996. Other, more detailed models of the mismatch include joint additive and convolutive bias compensation (see M. Afify, Y. Gong, and J.-P. Haton, "A Unified Maximum Likelihood Approach to Acoustic Mismatch Compensation: Application to Noisy Lombard Speech Recognition," in *Proc. Of IEEE Int. Conf. on Acoustics, Speech and Signal Processing*, Germany, 1997) and channel and noise estimation. (See D. Matrouf and J. L. Gauvain article, "Model Compensation for Noises in Training And Test Data," in *Proc. Of IEEE Internat. Conf. On Acoustics, Speech and Signal Processing*, Germany, 1997.)

SUMMARY OF THE INVENTION

In accordance with one embodiment of the present invention, an improved transformation method comprises providing an initial set of HMMs trained on a large amount of speech recorded in one condition, which provides rich information on co-articulation and speaker variation and a much smaller speech database collected in the target environment, which provides information on the test condition including channel, microphone, background noise and reverberation.

DESCRIPTION OF PREFERRED EMBODIMENTS OF THE PRESENT INVENTION

Figure 1:
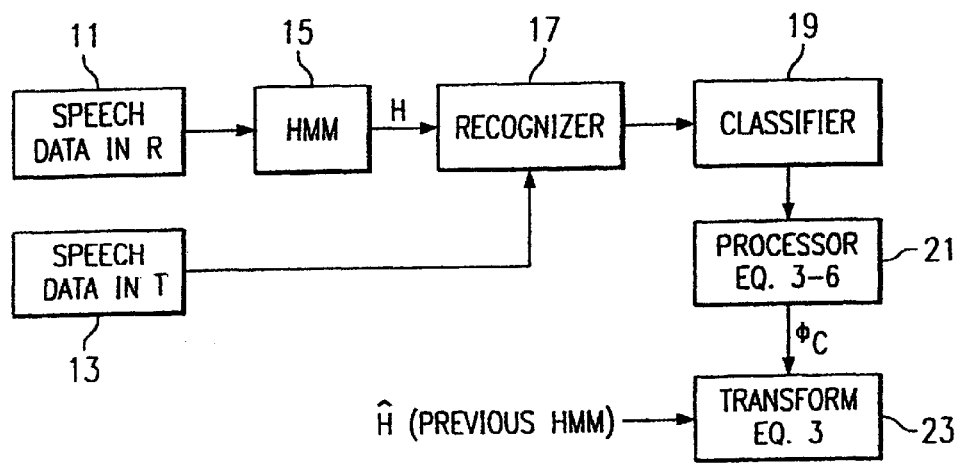
FIG. 1 is a block diagram of the system according to one embodiment of the present invention.

In accordance with applicants' preferred embodiment there are two sets of data, as illustrated by the system diagram of FIG. 1. First, there is speech utterances data collected in one reference environment (R) 11, from, e.g., one hundred speakers; second, there are utterance collected in the target (noisy) environment (T) 13, such as in a car with hands free microphone, for some much smaller number of speakers (e.g., twenty.) The speech data 11 contains information about co-articulation, and speaker variability. The environment is relatively quiet with low noise, and uses a high quality microphone. The amount of speech in database 13 is small (from about 20 speakers); it is used for adaptation, and the environment is background noise and reverberation and microphone is poor quality and in the hands free position in a car for example.

Figure 2:
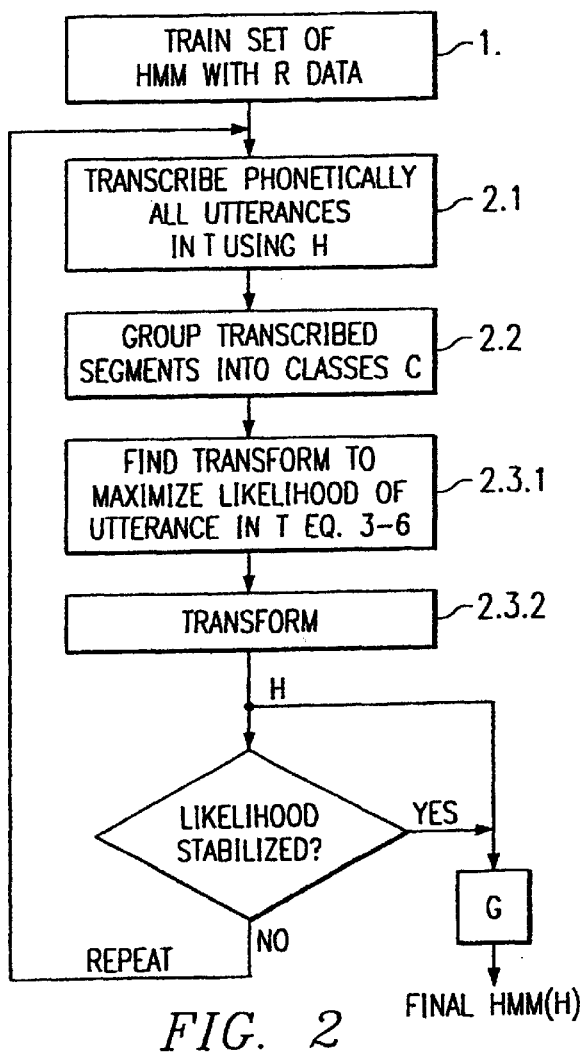
FIG. 2 is a flow chart of the method according to one embodiment of the present invention.

In accordance with a preferred embodiment of the present invention, the following procedure is illustrated in FIG. 2:

1. train a set of HMMs (H) with data collected in environment R;
2. repeat the following until likelihood of data T stabilizes:
   2.1 transcribe phonetically all utterances in T using H;
   2.2 group transcribed segments into a set of Classes C;

2.3. For each class c in total class C:
   2.3.1. find transformation $\Phi_c$ to maximize likelihood of utterance T; and
   2.3.2. transform HMMs using $\Phi_c$: H←$\Phi_c$Ĥ; where Ĥ is the previous HMM.

In Step 1 (FIG. 2) of HMM training (state 15 in FIG. 1), initial HMM models are trained with the speech utterances from speech data in environment R from database 11 to produce a set H of HMMs.

Step 2 will transform H iteratively until likelihood of data T give the model H stabilizes.

Figure 3:
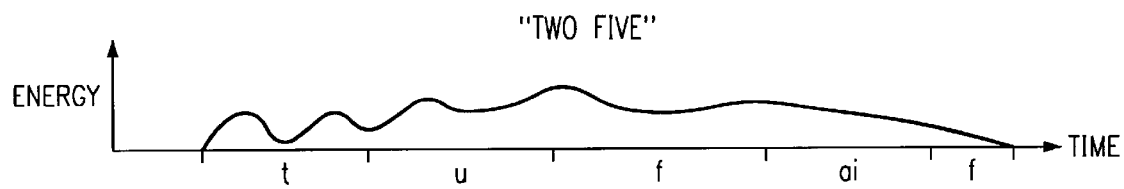
FIG. 3 illustrates the phonemes (segments) for "two five"

In Step 2.1, all utterances in speech data of the noisy target environment T are transcribed (i.e., recognized and labeled) using the models H from stage 15 at recognizer 17. In Step 2.1, we first transcribe phonetically all utterances in the noisy environment T, using two things: the utterance in T, and the HMM H. We want H transformed to T, where T is the target model. This is done by a machine recognizer. Viterbi decoding is first used to locate the starting and ending time frame of each phone segment, which defines the segment. The phone segments are phonetically labeled, such as "t", "u" for the word "two." FIG. 3 illustrates the transcribing of the words "two five" in terms of phones.

Figure 4:
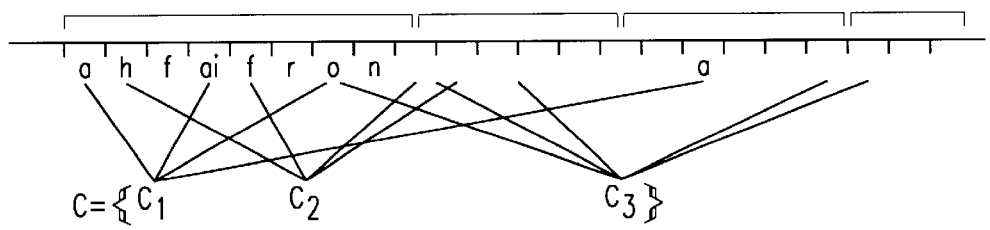
FIG. 4 illustrates grouping of phonemes into classes.

Training requires sufficient data to avoid poor training due to sparseness of data, in Step 2.2 the phone segments are grouped into phonetic classes according to their phonetic similarity and the number of frames with the same phonetic label occurring in the data. The greater the number of frames, the larger the potential number of phonetic classes. The phones are "t", "u", "f", "ai"; and "f" for the example "two five". The grouping into classes is illustrated in FIG. 4.

We use this to transform our initial HMM to another set of HMMs that are more suitable for recognition in the noisy environment, which in one embodiment case is in a car. In Step 2.3, after grouping into Classes C, for each class c of the total Classes C, the steps 2.3.1 and 2.3.2 are performed.

The first step 2.3.1 is to find a transformation which maximizes the likelihood of test utterance T. The transcription will give us many classes, and we try to reduce the number of classes for increased reliability. From the class we can transform to get HMMs suitable for recognition in the environment T. Instead of having one transformation for all, we divide into classes at classifier 19 and derive a transformation for each class. In 2.3.1, we find a transformation $\Phi_c$ to maximize likelihood of utterances T. In Step 2.3.2, we do the transformation of H=$\Phi$Ĥ, where Ĥ refers to the previous HMM. This changes the mean vector of the Gaussian distribution of HMMs according to:

$$\mu_{j,k,h} = \Phi_c \hat{\mu}_{j,k,h} \tag{3}$$

where $\mu_{j,k,h}$ is the transformed mean vector for state j, mixture component k of the HMM h, an $\hat{\mu}_{j,k,h}$ is the original mean vector, which has the form:

$$\hat{\mu} = [\omega, \mu_1, \mu_2, \ldots \mu_n]' \tag{4}$$

and $\omega$ is the offset of the regression.

The observation probability density of Gaussian mixture HMMs is in the form of:

$$b(o \mid j, k, h) = \frac{\exp\left(-\frac{1}{2}(o - \Phi_c \hat{\mu}_{j,k,h})' \sum_{j,k,h}^{-1} (o - \Phi_c \hat{\mu}_{j,k,h})\right)}{(2\pi)^{\frac{n}{2}} |\sum_{j,k,h}|^{\frac{1}{2}}} \tag{5}$$

After C. J. Leggetter et. al. reference, for example, the transformation that maximizes the likelihood is given by the following matrix equation:

$$\sum_{h \in c} \sum_{s \in S_h} \sum_{t \in T_s} \sum_{j \in \theta_h} \sum_{k \in \alpha_{h,j}} \gamma_{j,k,h}^{(s,t)} \sum_{j,k,h}^{-1} \left( O_t^s \hat{\mu}'_{j,k,h} = \sum_{h \in c} \sum_{s \in S_h} \sum_{t \in T_s} \sum_{j \in \theta_h} \sum_{k \in \alpha_{h,j}} \gamma_{j,k,h}^{(s,t)} \sum_{j,k,h}^{-1} \Phi_c \hat{\mu}_{j,k,h} \hat{\mu}'_{j,k,h} \right. \tag{6}$$

where:
   $S_h$ is the set of all segments aligned to HMM h,
   $T_s$ is the utterance frames in the segment s,
   $\theta_h$ is the states in the HMM h,
   $\alpha_{h,j}$ is all mixture components of HMM h at state j, and
   $\gamma_{j,k,h}^{(s,t)}$ is the probability of being in state j at time t with mixture component k, for the segment s of the model h. (For the C. J. Leggetter et. al. reference see C. J. Leggetter and P. C. Woodland, "Maximum Likelihood Linear Regression for Speaker Adaptation of Continuous Density HMMs, *Computer, Speech and Language*, 9(2):171–185, 1995.)

Equation 6 represents a linear system of $\Phi_c$ and can be solved by any appropriate technique.

After finding $\Phi_c$ for each class c, in Step 2.3.2 all HMMs, all classes are updated using the new transformations H from $\Phi$(Ĥ). The equation for updating the new set of HMMs is equation 3.

As discussed above, the whole process is repeated at step 2 using the new transformed set of HMMs. The new set is transcribed. All utterances in target T are transcribed using H (new set of HMMs). The transcribed (segmented and labeled) phones are regrouped again into classes and at step 2.3.1, the transformation $\Phi_c$ is found which maximizes likelihood using equations 3–6. The result is transformed and the whole process is repeated until the likelihood of the data T given H stabilizes.

The procedure is evaluated for connected digit recognition.

The environment R consists of the TI-DIGITS database, down-sampled to 8 kHz. This database is described in R. G. Leonard, "A Database for Speaker-Independent Digit Recognition," in *Proc. Of IEEE Internat. Conf. On Acoustics, Speech and Signal Processing*, pages 42.11.1–42.11.4, San Diego, 1984. This database was recorded over a high quality microphone in a very quiet room. The training part includes 8614 utterances from 1 to 7 digits by 112 speakers.

The environment T consists of utterances, also sampled at 8 kHz, recorded inside a parked car over a hands-free microphone mounted on the visor. Twenty speakers each read 40 strings of 4, 7, or 10 digits.

For the same 20 speakers, a separate recording session yielded 800 strings of 4, 7, or 10 digits. The number of digits in the utterance was kept unknown to the recognizer during the evaluation.

The feature vectors consist of 10 DFT mel-frequency cepstral coefficients (MFCC) along with their regression-based first-order time derivative at a frame rate of 20 ms.

Applicants use gender-dependent digit-specific phone models. There are about 78 HMMs per gender. Each state has self-loop, jump to next state and skip transitions. The number of states for a phone model is based on the average duration of phone segments in the training data, with some exceptions for practical considerations. Up to 8 Gaussian distributions per state are used. The HMMs are trained using an EM procedure.

Since we want to know the performance of the speaker-independent model transformation, and our evaluation data set has only 20 speakers, a jack-knife procedure was used in order to ensure speaker independence of the tests:

1. Repeat until all speakers are tested:
   1.1 select an untested speaker
   1.2 transform HMMs using the utterances of the remaining 19 speakers
   1.3 test the recognition performance on the selected speaker
2. Average the recognition results over speakers.

Figure 5:
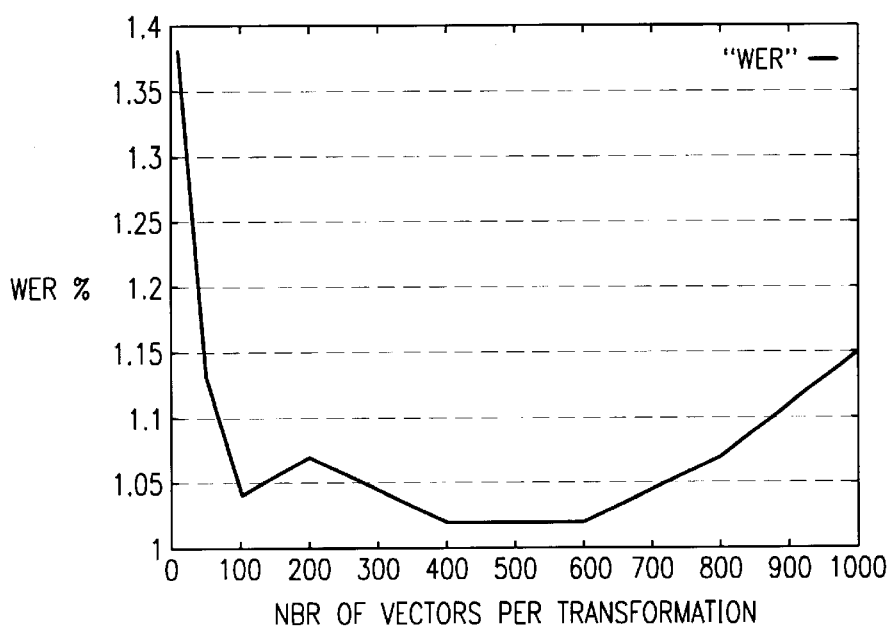
FIG. 5 illustrates WER as function of minimum number of vectors for transformation.

The recognizer was tested under four configurations:

1. Direct use of HMM models trained in R for recognition of utterances in T. As expected, this resulted in severe performance degradation due to microphone mismatch and background noise, with word error rates (WER) above 10%.
2. One unique bias ($\mu=\hat{\mu}+B$) for all phone models. The WER drops to 1.54%. Note that unique bias should outperform CMN, since it makes use of HMM structure. (See M. G. Rahim and B. H. Juang article entitled "Signal Bias Removal by Maximum Likelihood Estimation for Robust Telephone Speech Recognition" in *IEEE Trans. on Speech and Audio Processing*, 4(1):19–30, January 1996.)
3. With one unique linear transformation ($\mu=\hat{\mu}+B$) for all phone models. WER is reduced to 1.2%.
4. With a number N of linear transformations (Eq-3), where N is controlled in the experiments by M, the minimum number of frames required to introduce a transformation class. FIG. 5 shows the word error rate as a function of M. We can see that for M=500, the lowest WER of 1.02% is obtained.

To summarize, if we take unique bias as the baseline, the unique linear transformation reduces the error rate by about 20%, and our method, using the best set of N linear transformations, reduces the error rate by about 35%.

FIG. 5 shows that:

The transformation is not optimal if the minimum number of vectors per transformation is too large (e.g. M=1000). This confirms that the mismatch caused by the combination of distortion factors is state-dependent and therefore needs to be covered by an adequately large number of state-dependent transformations. Actually, if M=∞ then the system reduces to the case of unique linear transformation as the WER curve indicates.

Too many transformations result in poor performance (as M→0), because in this case the transformations will capture information specific to the 19 adaption speakers in addition to the acoustic conditions of the adaptation utterance.

Some test utterances contain unusually high background noise. This means that the WER could be further reduced if some noise resistant recognition feature, such as parallel model combination, were included. (For parallel model combination see M. J. F. Gales and S. J. Young, "HMM Recognition in Noise Using Parallel Model Combination, in *Proceedings of European Conference on Speech Communication and Technology*, volume II, pages 837–840, Berlin, 1993.)

Applicants present a procedure for obtaining accurate speaker-independent HMMs for hands-free digit recognition using initial HMMs trained on "high-quality" speech and using some adaptation utterances collected in the target environment. The procedure uses state-dependent linear transformations which are adjusted to yield speaker-independent performance. Experimental results show that the procedure gives substantial WER reduction over simple cepstral mean normalization. Our cross-environment recognition evaluation achieves performance (1% WER) similar to that of conventional environment-dependent, matched-condition training for similar tasks, such as digit recognition over the telephone network, yet only 20 speakers had to be collected in the target environment.

What is claimed is:

1. A method of transforming Hidden Markov Models (HMM) for speaker independent recognition in a noisy environment, comprising the steps of:
   a. training a set of HMMs H with data collected in low noise environment R;
   b. transcribing phonetically all utterances in noisy environment T using HMMs H;
   c. grouping transcribed segments into a set of Classes C where each class is according to phonetic similarity;
   d. for each subclass c of Classes C, finding transformation $\Phi_c$ to maximize likelihood of utterances in T given H;
   e. transforming HMMs using $\Phi_c$ : H←$\Phi_c\hat{H}$ where $\hat{H}$ is the previous HMM and wherein the transformation is a linear transformation; and
   f. repeating steps b through f with new HMMs H until the likelihood stabilizes.

2. The method of claim 1 wherein said data for environment R is recorded in a quiet condition with a quality microphone and with rich information on coarticulation and speaker variability.

3. The method of claim 1 including the step of controlling the number of transformation classes to get optimum recognition performance.

4. The method of claim 3 wherein said data for environment R is recorded in a quiet condition with a quality microphone and with rich information on corarticulation and speaker variability.

5. The method of claim 3 wherein said data collected in low noise environment R is from at least 100 speakers and said utterances in environment T is from about 20 speakers.

6. The method of claim 1 wherein said data collected in low noise environment R is from at least 100 speakers and said utterances in environment T is from about 20 speakers.

* * * * *